United States Patent [19]

Bonnard et al.

[11] 4,019,537
[45] Apr. 26, 1977

[54] ARRANGEMENT FOR MOUNTING GUIDE VANES OR OTHER TRANSVERSE OBJECTS INSIDE A CONDUIT

[75] Inventors: Pierre Marcel Bonnard, Beynes; Pierre Bonnet; Louis Duthion, both of Paris, all of France

[73] Assignees: Bertin & Cie, Plaisir; Aeroport de Paris, Paris, both of France

[22] Filed: Mar. 27, 1975

[21] Appl. No.: 562,663

[30] Foreign Application Priority Data

Mar. 28, 1974 France .................... 74.10802

[52] U.S. Cl. .................. 138/37; 138/39; 415/183; 415/208; 415/216
[51] Int. Cl.² .......................... F15D 1/04
[58] Field of Search .......... 138/37, 38, 39; 137/574; 98/121 R; 110/97 R; 181/36 B, 49; 60/230; 302/64; 415/183, 216, 218, 208

[56] References Cited

UNITED STATES PATENTS

| | | | |
|---|---|---|---|
| 637,628 | 11/1899 | Mackay | 138/38 |
| 2,034,822 | 3/1936 | Morrow | 138/38 |
| 2,273,818 | 2/1942 | Childers et al. | 138/89 X |
| 2,305,136 | 12/1942 | Campbell | 415/183 |
| 2,662,553 | 12/1953 | Dimmock | 138/39 X |
| 2,667,185 | 1/1954 | Beavers | 138/37 |
| 2,703,045 | 3/1955 | Gilbert et al. | 98/121 R |
| 2,705,973 | 4/1955 | Kice | 138/89 |
| 3,602,262 | 8/1971 | Hinden | 138/37 X |
| 3,820,570 | 6/1974 | Holzhuter | 138/39 |

FOREIGN PATENTS OR APPLICATIONS 2,110,770  6/1972  France .................. 138/39

*Primary Examiner*—Richard E. Aegerter
*Assistant Examiner*—James E. Bryant, III
*Attorney, Agent, or Firm*—A. W. Breiner

[57] ABSTRACT

An arrangement for mounting a cascade of guide vanes or other objects extending across a conduit, characterized in that there is provided within the conduit two longitudinal partitions or plates separated by a small gap, and in that said object is formed in two parts each of which has one end fixed to a wall of the conduit and the other to the longitudinal plate nearest to this fixing point.

4 Claims, 7 Drawing Figures

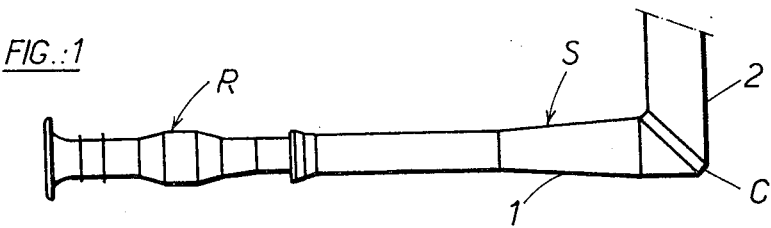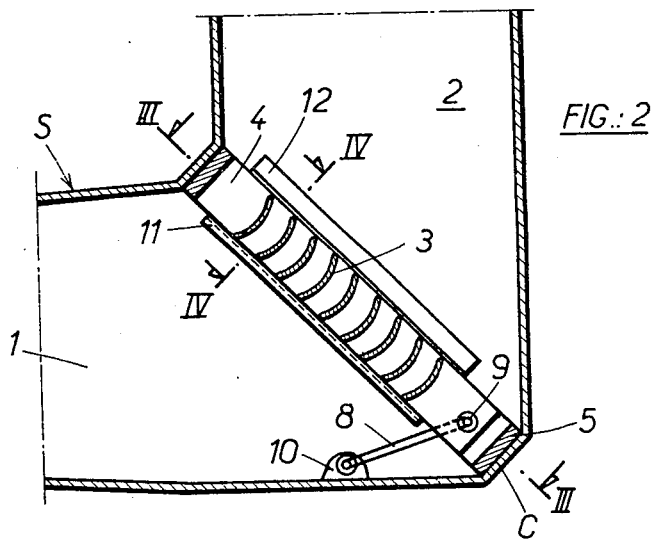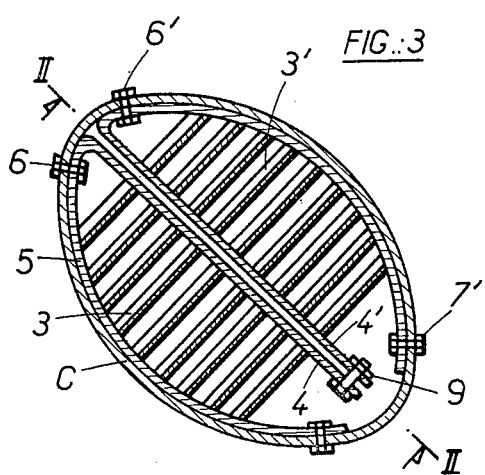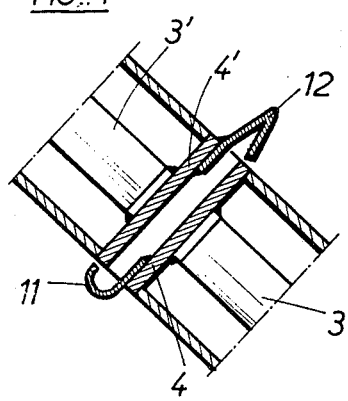

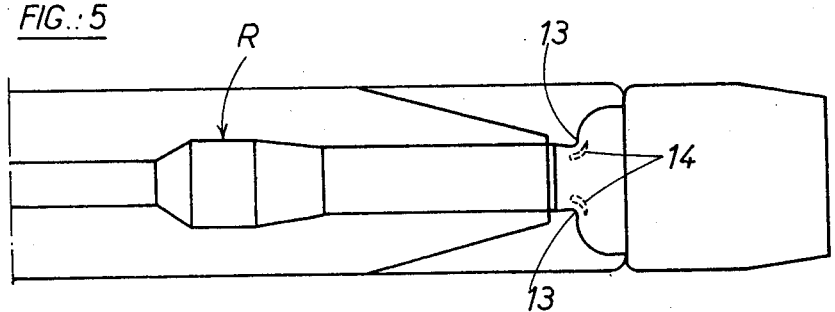
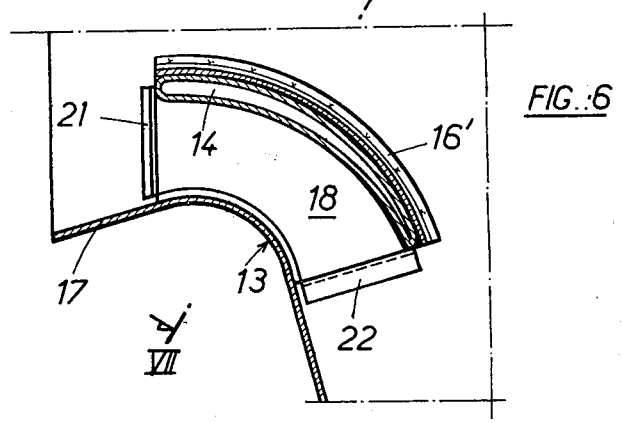
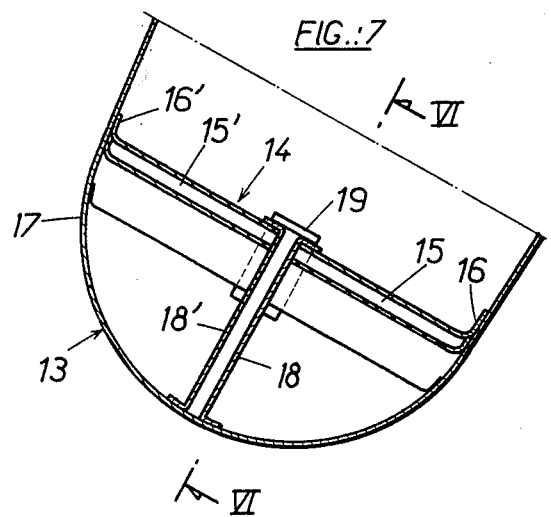

ARRANGEMENT FOR MOUNTING GUIDE VANES OR OTHER TRANSVERSE OBJECTS INSIDE A CONDUIT

The method customarily used for securing inside a conduit an object extending across it, such as a deflecting vane inside an elbow in the conduit, is to fix the ends of the object to opposite parts of the conduit wall by welding, bolting, riveting or insertion. This routine practice gives satisfaction provided that the loads exerted at the securing points are not too high, but there are various situations in which this condition is no longer met. Cases in point include the existence of vibration or large variations in temperature, and this the more so when the conduit walls are thin.

Such conditions are encountered for example in the case of gas turbine exhaust nozzles, and more particularly in elbow sections equipped with the deflecting vanes required in certain exhaust nozzles acting as silencers.

In order to reduce vibration, it is known in the prior art to provide in the conduit one or more longitudinal partitions which help to secure the object extending across it and at the same time support the object between its terminal attachments.

The main object of the present invention is to substantially reduce the stresses acting at the attachment points of such an object extending across a conduit and to permit free thermal expansion of the various system components and notably of said object and said conduit.

Examples of such objects include vanes required to guide a high-speed fluid flow at high temperature, such as the flow of exhaust gas from a turbojet.

Other objects of the invention are to reduce and possibly eliminate vibration in said component parts and notably in said objects, to close the space between said longitudinal partitions and to reduce or eliminate all stresses, especially under operating conditions.

In accordance with the present invention, there is provided within the conduit two longitudinal partitions or plates spaced slightly from each other, and the object extending across the conduit is formed in two parts each of which has its ends fixed respectively to a wall of the conduit and to the longitudinal plate nearest to that fixing point. The slight spacing referred to is determined with due account for possible deformations, and for thermal expansion in particular, in such manner that neither the plates nor the ends or the attachment points of the object to said plates can touch one another.

The stresses at the points of attachment of the object to the conduit wall are thereby reduced to a minimum, thus improving endurance and avoiding the need to reinforce the conduit locally, which in turn results in a saving in weight and cost.

The description which follows with reference to the accompanying non-limitative exemplary drawings will give a clear understanding of how the invention can be carried into practice.

In the drawings:

FIG. 1 shows diagrammatically in side elevation a turbojet leading into a silencing pipe formed with an elbow section of approximately 90° relative to the substantially vertical section;

FIG. 2 is a fragmental cross-sectional view on an enlarged scale of the elbow section equipped in accordance with the present invention, the cross-section being taken on the line II—II of FIG. 3;

FIGS. 3 and 4 are sectional views on the lines III—III and IV—IV respectively of FIG. 2, with FIG. 4 giving a detail view on a still more enlarged scale;

FIG. 5 schematically illustrates a turbojet having a flared exhaust nozzle equipped with an exhaust ejector;

FIG. 6 is a partial sectional view on an enlarged scale of the flared portion of such a nozzle, the section being taken through the line VI—VI of FIG. 7; and FIG. 7 is a section taken on the line VII—VII of FIG. 6.

FIG. 1 shows a conventional arrangement of a turbojet R and a silencer S having two circular-section conduits 1 and 2 joined at right angles by an elbow C equipped with a cascade (of vanes) for ensuring proper flow.

In accordance with the present invention and as shown in FIGS. 2, 3 and 4, the vanes of this cascade form two sets thereof, respectively designated 3 and 3', arranged on either side of a longitudinal plane of the conduit, which plane is in this case the symmetry plane. The two sets of vanes are restrained by two substantially identical lyre-shaped supports 4 and 4' each of which consists of a bent metal strip having a flat internal arm and a semi-elliptic external arm. The vanes are welded between these arms and each lyre is then bolted to an elliptic corner piece 5 of elbow C by means of bolts 6, 6' and 7, 7'.

It should be noted that because the vanes 3, 3' are only half as long as conventional vanes, they have a higher natural vibration frequency and therefore have less tendency to resonate with the flow or with conduit components. Equally, it is possible to fabricate them from thinner sheet-metal.

It is a teaching of this invention that the flat internal arms 4, 4' of the lyres form slightly spaced and flexible longitudinal thrust points which enable the vanes 3, 3' to expand without transmitting excessive stresses to corner-piece 5. These flat arms preferably have unrestrained ends in order to be able to expand likewise without stressing the conduit.

In order to withstand the thrust exerted on the vanes by the fluid flowing through the conduit, it is possible to provide a tie-link 8 bolted at 9 to the free ends of the flat arms and hinged at its other end to a gusset 10 welded to the interior of conduit 1.

The narrow gap between the flat arms can be closed and shrouded by landing-edge and trailing-edge fitted parts 11 and 12 welded to flat arms 4 and 4', respectively, and terminating proximate the arms 4' and 4, respectively. Firstly, this prevents any undeflected gas streams from passing through the gap and disrupting the flow, and secondly it does not hinder fitting the individual lyres independently of each other.

Lastly, it should be noted that the two sets of vanes 3 and 3' can be mutually offset along the arms 4 and 4' in order to stagger their attachment points to the flat arms and thus prevent them from touching one another.

It goes without saying that applications of the arrangement hereinbefore described for a deflector cascade are by no means limited to ground-based silencer-forming conduits for independent turbojets, as illustrated in FIG. 1, but include likewise any angled pipe for conveying any fluid whatsoever, and most notably curved turbojet exhaust nozzles of the kind suitable for use in an underground fog dispersal installation of the kind described in Bertin et al, U.S. Pat. No. 3,231,195 (see FIG. 4 thereof).

As for the alternative embodiment to be described hereinbelow with reference to FIGS. 5, 6 and 7, it should find worthwhile application in the case of exhaust-nozzle ejectors of the kind described in Guienne et al, U.S. Pat. No. 3,212,700 (see FIGS. 5 and 6 thereof).

In FIGS. 5, 6 and 7 appended hereto, turbojet R includes an exhaust nozzle having a double-flare 13, 13 with fairly small radii of curvature. In order to prevent separation of the flow of exhaust gases, a guide vane 14 is provided at the entrance to each flared portion. One of these vanes 14 and its associated flared portion 13 are illustrated in greater detail in FIGS. 6 and 7.

In accordance with the invention, vane 14 comprises two elements 15 and 15' substantially half as long as the width of the conduit along that plane. Each vane element has flanged rims 16 (or 16') welded to the wall 17 of flared portion 13 and is restrained proximate the centre of the conduit by a plate 18 (or 18') itself formed with flanged edges bearing against and welded, at one end, to wall 17 adjacent the symmetry plane thereof, and at the other end to the outer surface of the associated vane element 15 (or 15').

The plates 18, 18' are separated by a small gap in order to allow for possible expansion of the assembly. In order to avoid aerodynamic perturbations, this gap is preferably closed to the flow by an outer plate 19 welded to element 15 and remaining in proximity to the element 15', and also by leading-edge and trailing-edge parts 21 and 22, respectively, similar to the parts 11 and 12 of FIG. 4.

We claim:
1. A fluid conveying duct bounded by a wall having two opposite portions facing one another, comprising: two closely adjacent though mutually spaced plates generally parallel to and on both sides of a plane extending longitudinally with respect to the fluid flow direction in said duct and bounding therebetween a laminar gap extending in said plane, said plates projecting from a first location of said wall intermediate said facing portions thereof, generally crosswise of said duct, to end short of a second location of said wall intermediate said facing portions thereof and opposite to said first location, whereby each of said plates has a proximal end adjacent said first location and a distal end spaced from said second location,
a gusset fast with said wall at a third location adjacent said second location,
a tie-link hingedly connecting the distal end of said plates to said gusset, and
a first and a second stationary set of transverse fluid guiding members each having an outer end respectively fixed to one or the other of said opposite wall portions and an inner end respectively fast with that one of said two plates which is on the same side of said plane as the respective member.

2. Duct as claimed in claim 1, wherein the two plates extend in a central region of said duct, the laminar gap therebetween lying substantially in a plane of symmetry of said duct.

3. Duct as claimed in claim 1, further comprising a leading-edge section and a trailing-edge section substantially closing the laminar gap between the plates, respectively at an upstream side and at a downstream side of said gap.

4. Duct as claimed in claim 3, wherein the leading-edge section is fast with one plate and ends short of the other plate, whereas the trailing-edge section is fast with said other plate and ends short of said one plate.

* * * * *